US012684238B2

(12) United States Patent
Mogami

(10) Patent No.: US 12,684,238 B2
(45) Date of Patent: Jul. 14, 2026

(54) IMAGE STABILIZATION APPARATUS AND METHOD, AND IMAGE CAPTURING SYSTEM

(71) Applicant: CANON KABUSHIKI KAISHA, Tokyo (JP)

(72) Inventor: Tomomi Mogami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 81 days.

(21) Appl. No.: 18/408,139

(22) Filed: Jan. 9, 2024

(65) Prior Publication Data

US 2024/0236490 A1     Jul. 11, 2024

(30) Foreign Application Priority Data

Jan. 11, 2023     (JP) ................................. 2023-002559

(51) Int. Cl.
    *H04N 23/68*      (2023.01)
    *H04N 23/667*    (2023.01)

(52) U.S. Cl.
    CPC ....... *H04N 23/6845* (2023.01); *H04N 23/667* (2023.01); *H04N 23/687* (2023.01)

(58) Field of Classification Search
    CPC .... H04N 23/663; H04N 23/667; H04N 23/68; H04N 23/682; H04N 23/683; H04N 23/684; H04N 23/6842; H04N 23/6845; H04N 23/685; H04N 23/687
    See application file for complete search history.

(56) References Cited

U.S. PATENT DOCUMENTS

| | | | | |
|---|---|---|---|---|
| 2007/0242936 A1* | 10/2007 | Chujo | .................... | G03B 17/00 |
| | | | | 396/55 |
| 2007/0291114 A1* | 12/2007 | Oshima | .............. | H04N 23/6815 |
| | | | | 348/126 |
| 2009/0009614 A1* | 1/2009 | Kawai | .................... | H04N 23/76 |
| | | | | 348/E5.024 |
| 2013/0107106 A1* | 5/2013 | Nakai | .................... | H04N 23/69 |
| | | | | 348/E5.037 |
| 2020/0195843 A1* | 6/2020 | Kawawa | ................ | H04N 5/232 |
| 2022/0385800 A1* | 12/2022 | Naito | .................... | H04N 23/55 |
| 2023/0239572 A1* | 7/2023 | Naito | ................. | H04N 23/6812 |
| | | | | 348/207.99 |

FOREIGN PATENT DOCUMENTS

| | | |
|---|---|---|
| JP | 2014-039223 A | 2/2014 |

* cited by examiner

*Primary Examiner* — Daniel M Pasiewicz
(74) *Attorney, Agent, or Firm* — Cowan, Liebowitz & Latman, P.C.

(57) ABSTRACT

An image stabilization apparatus comprising: a control unit that controls image stabilization for reducing image blur, by shooting a plurality of images with an image sensor, and aligning and compositing the plurality of images; an acquisition unit that acquires information relating to an exposure period and a resolving power of an image capturing system including the image sensor; and a determination unit that determines whether to perform the image stabilization, based on the information.

16 Claims, 5 Drawing Sheets

F I G. 1A
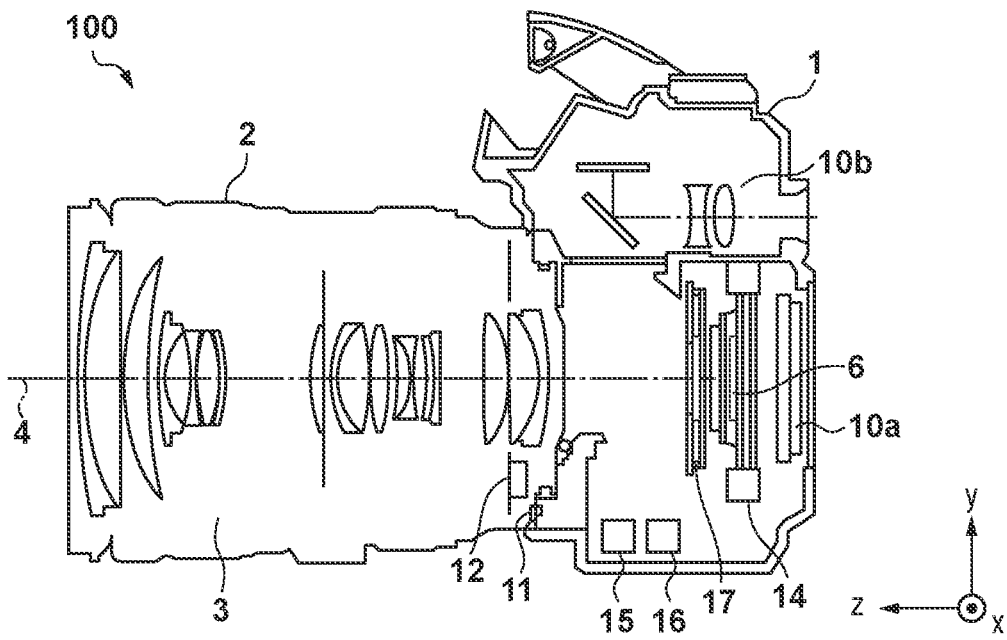

F I G. 1B

F I G. 4
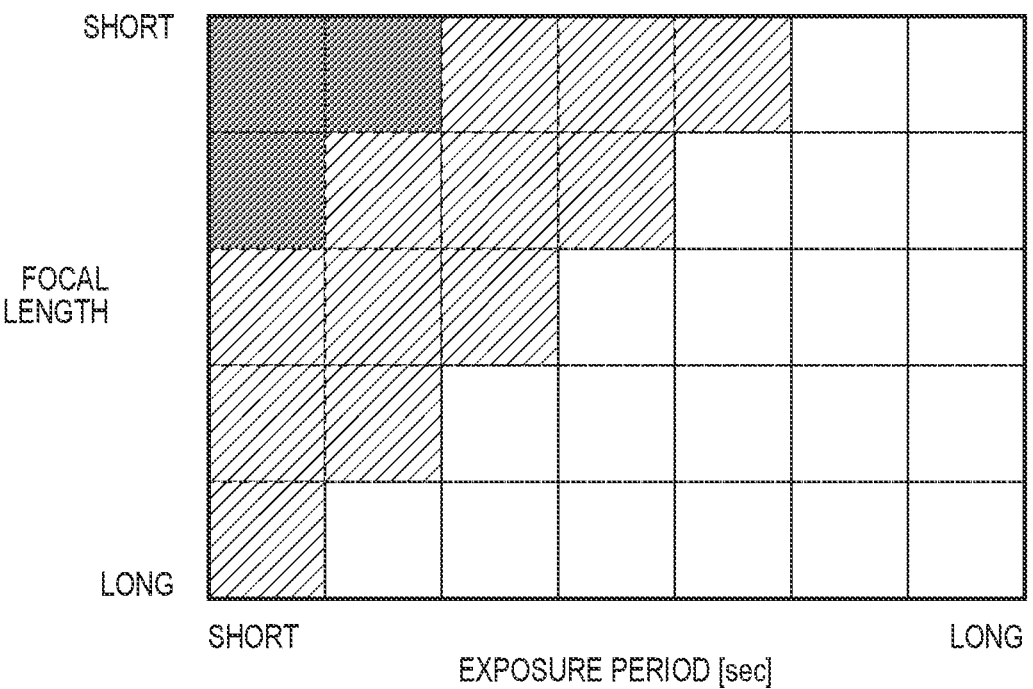
F I G. 5
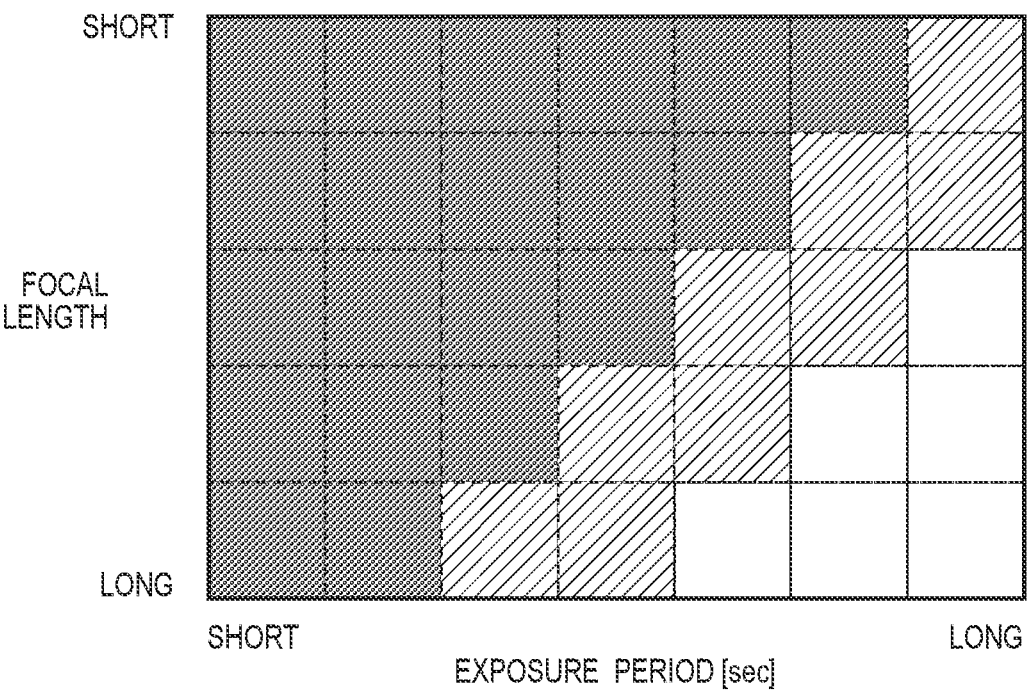

F I G. 6
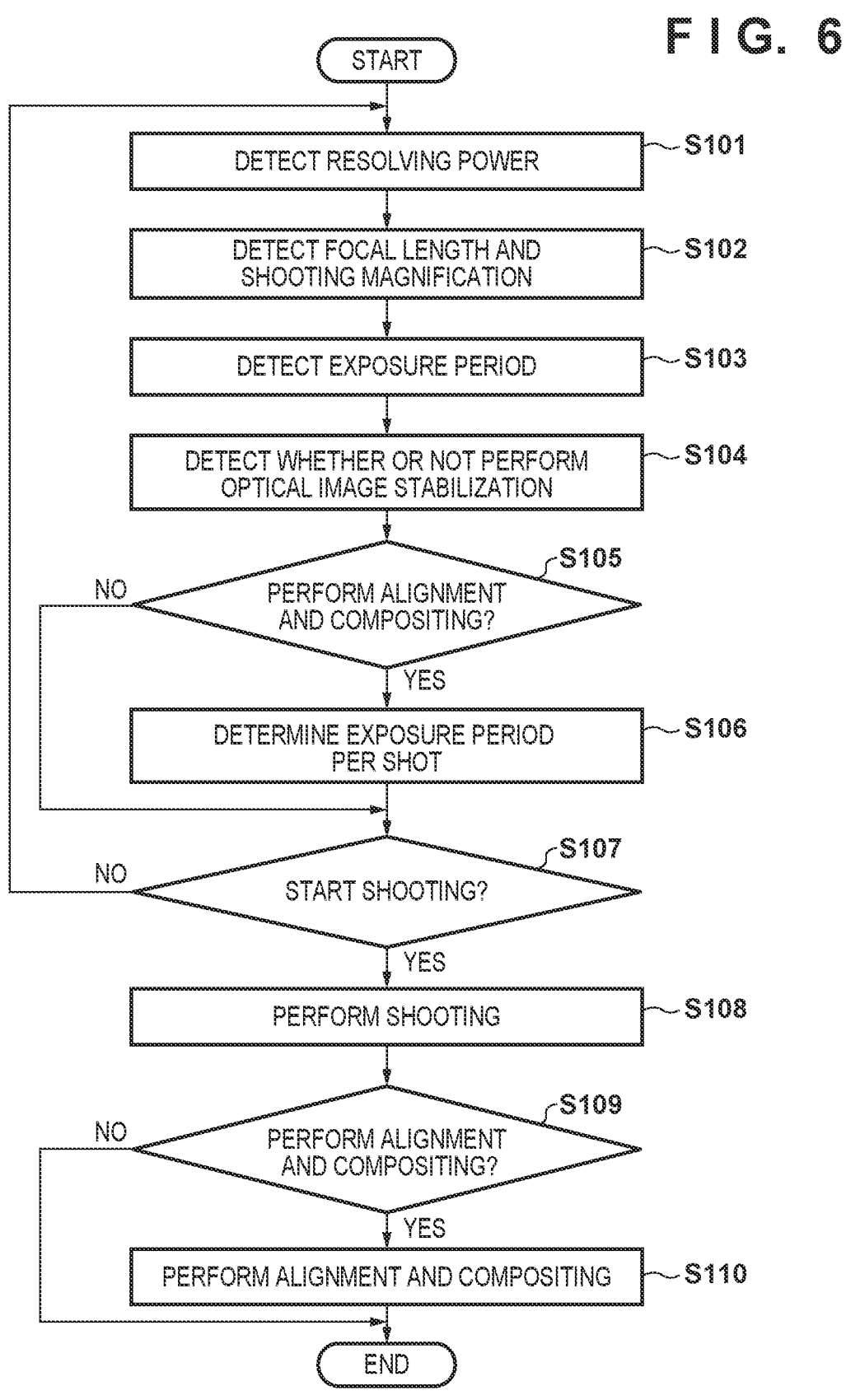

IMAGE STABILIZATION APPARATUS AND METHOD, AND IMAGE CAPTURING SYSTEM

BACKGROUND OF THE INVENTION

Field of the Invention

The present invention relates to an image stabilization apparatus and method and an image capturing system, and more particularly to an image stabilization technique for preventing image deterioration by correcting shake caused by vibration such as camera shake.

Description of the Related Art

In recent years, many image capturing apparatuses and imaging lenses come installed with an image stabilization mechanism. Image stabilization mechanisms are able to reduce the influence of camera shake on images shot with the image capturing apparatus handheld.

Several image stabilization methods have heretofore been proposed for use in image capturing apparatuses, and, for example, a known optical image stabilization method involves driving one or more lenses of an imaging optical system or an image sensor in the image capturing apparatus so as to counteract shake. Also, Japanese Patent Laid-Open No. 2014-39223 discloses a method for aligning and compositing a plurality of images shot at a high frame rate. Furthermore, image stabilization is also performed using a combination of these methods.

However, with Japanese Patent Laid-Open No. 2014-39223, shooting and alignment/compositing of images is performed without taking the shooting magnification and resolving power into consideration, and thus there is a problem in that, depending on the shooting magnification and resolving power, the quality of images decreases and processing load increases due to unnecessary alignment and compositing.

SUMMARY OF THE INVENTION

The present invention has been made in consideration of the above situation, and implements image stabilization through alignment and compositing more efficiently.

According to the present invention, provided is an image stabilization apparatus comprising one or more processors and/or circuitry which function as: a control unit that controls image stabilization for reducing image blur, by shooting a plurality of images with an image sensor, and aligning and compositing the plurality of images; an acquisition unit that acquires information relating to an exposure period and a resolving power of an image capturing system including the image sensor; and a determination unit that determines whether to perform the image stabilization, based on the information.

Further, according to the present invention, provided is an image capturing system comprising: an image sensor; and an image stabilization apparatus comprising one or more processors and/or circuitry which function as: a control unit that controls image stabilization for reducing image blur, by shooting a plurality of images with an image sensor, and aligning and compositing the plurality of images; an acquisition unit that acquires information relating to an exposure period and a resolving power of an image capturing system including the image sensor; and a determination unit that determines whether to perform the image stabilization, based on the information.

Furthermore, according to the present invention, provided is an image stabilization method comprising: acquiring information relating to a focal length, a shooting magnification, an exposure period, and a resolving power of an image capturing system including an image sensor; determining whether the resolving power decreases due to shake of a predetermined magnitude occurring, in a case of performing shooting under conditions according to the information; and performing control to perform image stabilization if it is determined that the resolving power will decrease, and to not perform the image stabilization if it is determined that the resolving power will not decrease, wherein the image stabilization is processing for reducing image blur, by shooting a plurality of images with the image sensor, and aligning and compositing the plurality of images.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 1A and 1B are respectively a cross-sectional view of an image capturing system in an embodiment of the present invention and a block diagram showing a schematic functional configuration thereof.

FIG. 4 is a schematic diagram showing the influence of shake on the resolving power of the system which depends on focal length and exposure period in the case where the shooting magnification is larger than in the example in FIG. 2 in the embodiment.

FIG. 5 is a schematic diagram showing the influence of shake on the resolving power of the system which depends on focal length and exposure period in the case of performing optical image stabilization in the embodiment.

FIG. 6 is a flowchart illustrating processing by the image capturing system in the embodiment.

DESCRIPTION OF THE EMBODIMENTS

Figure 2:
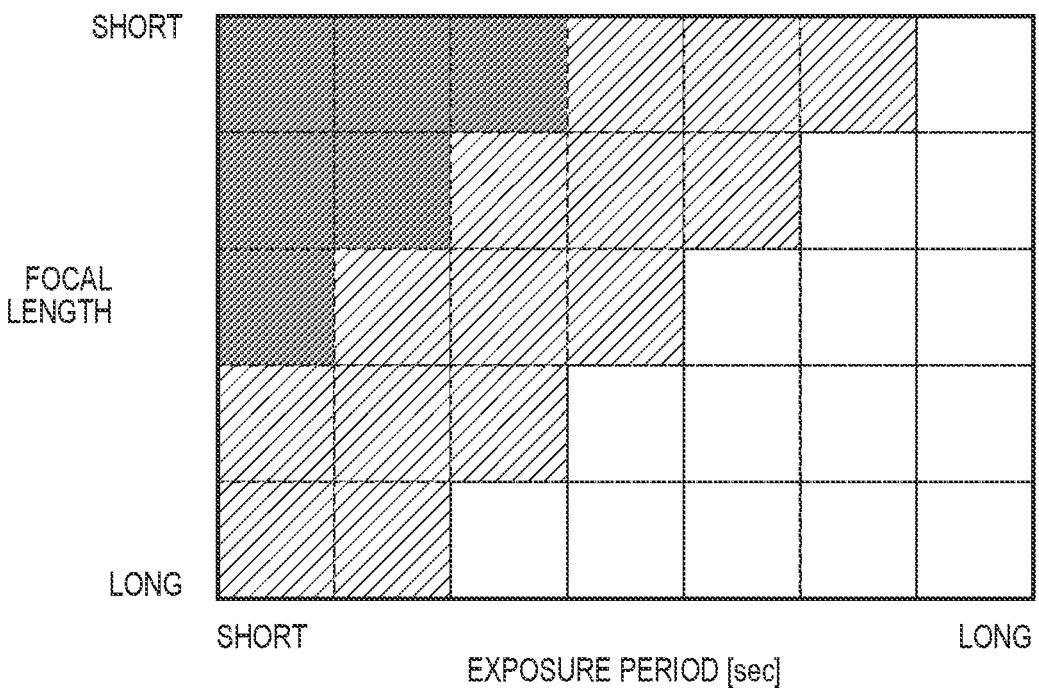
FIG. 2 is a schematic diagram showing the influence of shake on the resolving power of the system which depends on focal length and exposure period in the embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

Hereinafter, embodiments of the present invention will be described.

Configuration of Image Capturing System

Figure 1B:
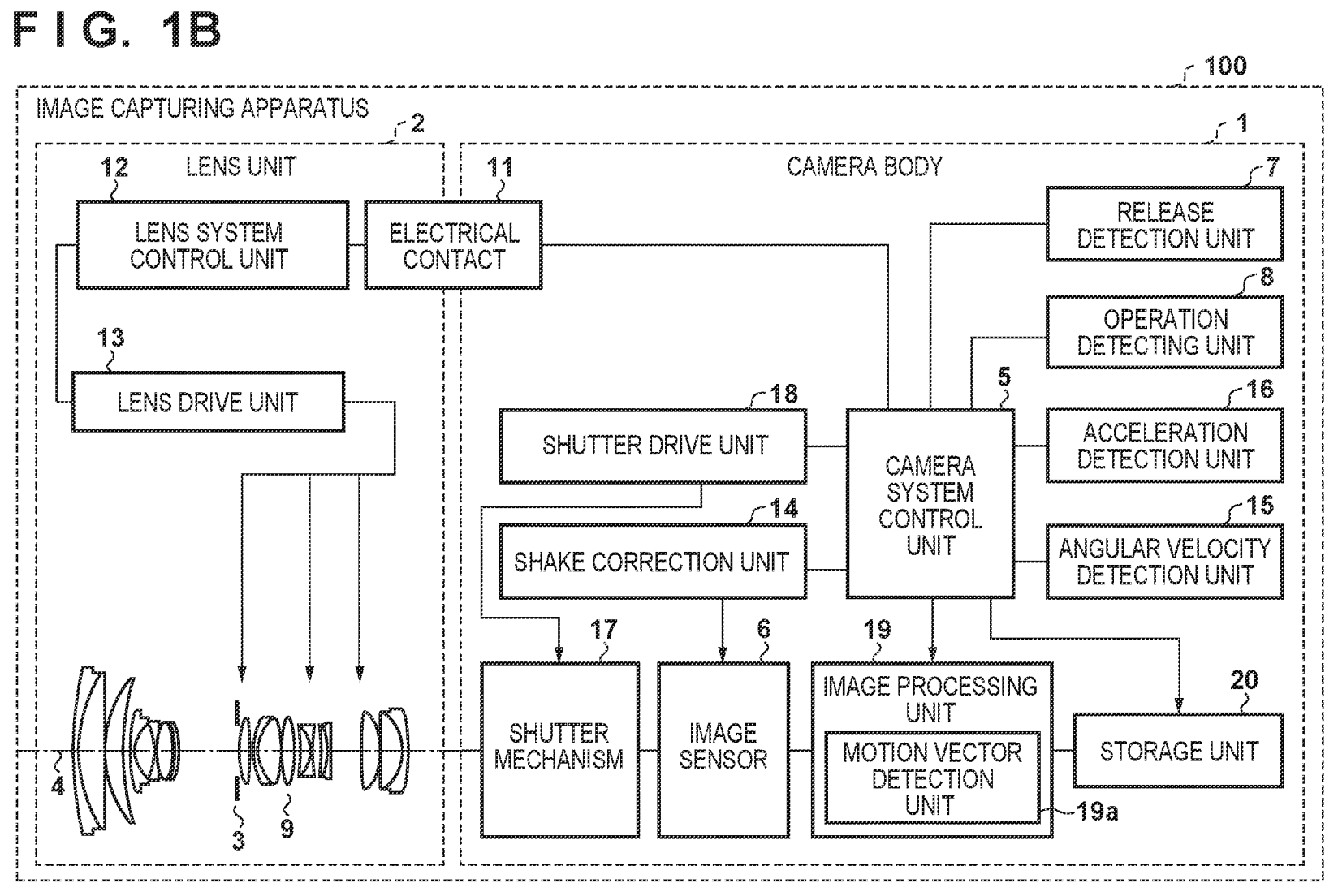

FIG. 1A is a central cross-sectional view showing an outline of the configuration of an image capturing system including the image stabilization apparatus according to the present embodiment, and FIG. 1B is a block diagram showing a functional configuration of the image capturing system 100.

Note that, in the present embodiment, a so-called interchangeable lens camera in which a lens unit 2 is removably mounted on a camera body 1 will be described, but the present invention is not limited thereto, and can also be applied to an image capturing apparatus in which the lens unit 2 is fixed to the camera body 1. Also, the image capturing system 100 may be any electronic device provided with a camera function, examples of which include cameras such as digital cameras and digital video cameras, mobile phones and computers equipped with a camera, game consoles and the like.

The image capturing system 100 is constituted by the lens unit 2 and the camera body 1, and the lens unit 2 and the camera body 1 are detachably connected to each other via an electrical contact 11. An optical axis 4 represents the optical axis of an imaging optical system 3 constituted inside the lens unit 2. The imaging optical system 3 is provided with a focus lens, a diaphragm, a correction lens 9 and the like, and is driven by a lens drive unit 13, based on control signals from a lens system control unit 12.

A shutter mechanism 17 is driven and controlled by a shutter drive unit 18, such that an image sensor 6 is exposed at a shutter speed (exposure period) set by a user or determined by a camera system control unit 5.

The image sensor 6 accumulates electric charge by photoelectrically converting a light image of the subject that is incident on an image plane via the lens unit 2, and outputs an electrical signal corresponding to the accumulated charge. Then, by acquiring an appropriate exposure amount and an evaluation amount for focus adjustment and adjusting the imaging optical system 3, based on the electrical signal output by the image sensor 6, a correctly exposed image of the subject can be formed on the image plane of the image sensor 6.

Also, the image sensor 6 has an electronic shutter function, and is able to control the exposure period (charge accumulation period) by controlling the reset and readout timing of the charge accumulated in the image sensor 6.

An image processing unit 19 has an analog/digital (A/D) converter, a white balance adjustment circuit, a gamma correction circuit, an interpolation computation circuit and the like, and, upon acquiring the electrical signal that is output by the image sensor 6, performs image processing, generates image data for recording, and stores the generated image data in a storage unit 20. Also, the image processing unit 19 performs data compression on images, videos, audio and the like with a predetermined compression method.

Furthermore, the image processing unit 19 is provided with a motion vector detection unit 19*a* that calculates motion vectors which are movement amounts that are based on captured images, and the image processing unit 19 acquires the movement amounts of images by comparing the images of a plurality of frames acquired by the image sensor 6 and detecting the motion vectors. The image processing unit 19 is then able to perform image stabilization, by compositing images cut out from the images of the plurality of frames in different positions, based on the motion vectors.

The camera system control unit 5 computes a shake correction amount for reducing the influence of shake, based on signals output by an acceleration detection unit 16 and an angular velocity detection unit 15, and outputs the shake correction amount to a shake correction unit 14 and the lens system control unit 12.

The lens system control unit 12 outputs a drive command of the correction lens 9 to the lens drive unit 13, based on the shake correction amount from the camera system control unit 5. The lens drive unit 13 performs shake correction that takes into account both angular shake and translational shake, by driving the correction lens 9 so as to counteract shake in an x-direction and a y-direction shown in FIG. 1A.

On the other hand, the shake correction unit 14 drives the image sensor 6 so as to counteract shake, based on the shake correction amount received from the camera system control unit 5. The shake correction unit 14 drives the image sensor 6 in the x-direction and the y-direction shown in FIG. 1A, and performs shake correction that takes into account both angular shake and translational shake. Furthermore, the shake correction unit 14 performs shake correction that takes into account both translational shake and angular shake that is caused by rotational motion about a z-axis, by rotationally driving the image sensor 6 about the z-axis.

Note that, in the coordinate axes shown in FIG. 1A, the z-axis is parallel to the optical axis 4, and an x-axis and a y-axis are orthogonal to the z-axis and parallel to the sides of the image sensor 6. Note that the origin of the coordinate axes is shown outside the image capturing system 100 in order to make the diagram easier to see, but, in FIG. 1A, the origin is actually located in the center of the image sensor 6.

Also, the correction method that is based on the shake correction amount computed by the camera system control unit 5 is not limited to this method, and may take another form.

A release detection unit 7 detects an open/close signal of a release (not shown), and sends the detected open/close signal to the camera system control unit 5. There are two types of open/close signals that are detected by the release detection unit 7, and the release detection unit 7 is able to detect ON/OFF of a switch 1 that turns on when the release detection unit 7 is half-pressed and a switch 2 that turns on when the release detection unit 7 is fully pressed.

An operation detection unit 8 detects operations by a user on an operation unit (not shown), such as shutter speed, f-stop and mode settings.

Also, the image capturing system 100 has a back display device 10*a* provided on the back of the camera body 1 and an electronic viewfinder (EVF) 10*b* provided inside the viewfinder of the camera body 1.

Influence of Shake on Resolving Power of System

The resolving power of the system is determined by the resolving power of the lens unit 2 and the pixel count of the image to be recorded (resolving power of electrical signal output by the image sensor 6). The pixel count of the image to be recorded varies depending on variables such as the size and resolution settings of the image to be recorded, whether crop mode is on or off and the digital zoom magnification, even with the same camera. Herein, these settings will be referred to as shooting conditions relating to pixel count. Also, the resolving power of the lens unit 2 varies depending on the focal length even with the same lens unit. The system is rate-limited to the lower resolving power, and thus the two resolving powers are compared and the lower of the two is taken as the resolving power of the system.

In the case where the camera body 1 acquires the resolving power of the system, the camera body 1 acquires information indicating the resolving power of the lens unit 2 that depends on the current settings from the lens unit 2 by communication via the mount. Alternatively, information indicating the resolving power for each focal length may be acquired from the lens unit 2, and the resolving power of the lens unit 2 that depends on the current settings may be acquired by acquiring the information for the current focal length as appropriate. Also, information (lens ID, etc.) indicating the model number of the lens unit 2 may be acquired from the lens unit 2, and the camera body 1 may refer to information indicating the resolving power for each focal length of the lens unit 2 from a storage unit on the camera body 1 side based on the acquired information. Note that the modulation transfer function (MTF) can be used as information indicating the resolving power.

This similarly applies to the case where the lens unit 2 acquires the resolving power of the system, and information indicating the pixel count may be acquired directly by communication, or the pixel count determined by the hardware configuration of the image sensor 6 may be acquired and the current pixel count may be acquired by acquiring the shooting conditions relating to pixel count. Also, the current pixel count may be acquired from the model number of the camera body 1 and the shooting conditions relating to pixel count. Note that this similarly applies to the case where an external device that is not the camera body 1 or the lens unit 2 (e.g., a cloud connected to the camera body 1) acquires the resolving power of the system, with the external device directly or indirectly acquiring information indicating the pixel count and information indicating the resolving power of the imaging optical system from the camera body 1 and the lens unit 2, respectively, and acquiring the resolving power of the system based on this information.

The magnitude of the influence of shake is determined by the focal length and the exposure period, and the influence of shake tends to be greater as the focal length becomes longer and as the exposure period becomes longer. FIG. 2 is a table showing an example of the relationship of the resolving power of the system with focal length and exposure period when shake of a certain magnitude (shake amount V1) is applied to the image capturing system 100 having a resolving power R1.

In FIG. 2, the shaded portions indicate combinations for which the resolving power of the system does not drop when the shake of the shake amount V1 is applied (i.e., combinations in the case where the resolving power is R1), and the diagonal line portions indicate combinations for which the resolving power of the system starts to drop due to the shake. Also, the white portions indicate combinations for which the resolving power of the system drops considerably due to the shake.

Figure 3:
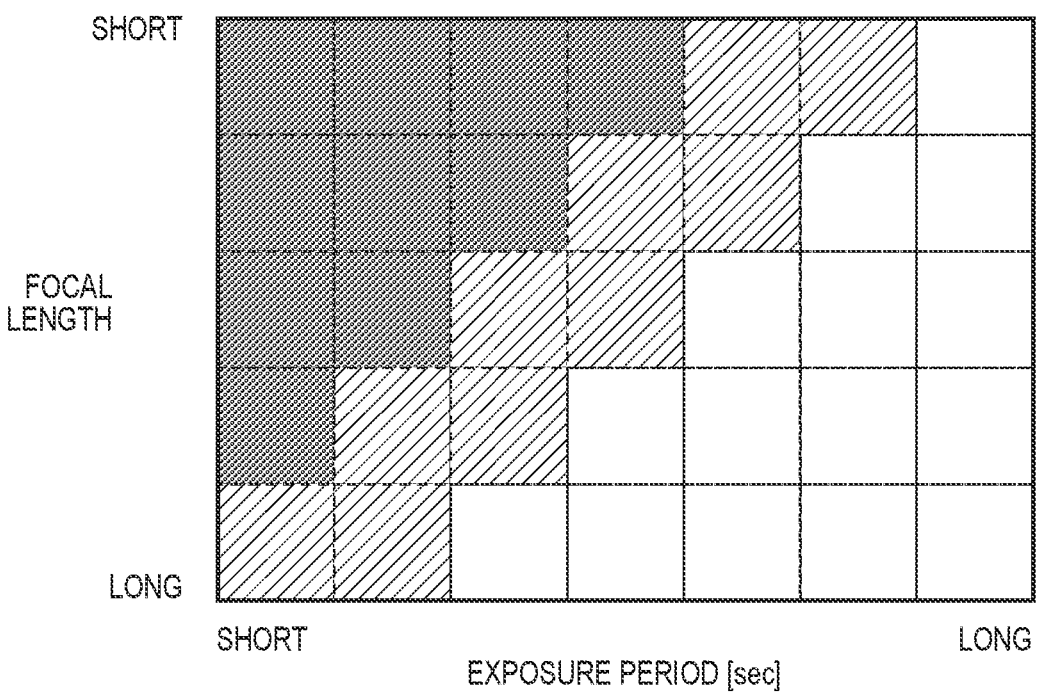
FIG. 3 is a schematic diagram showing the influence of shake on the resolving power of the system which depends on focal length and exposure period in the case where the resolving power of the system is lower than in the example in FIG. 2 in the embodiment.

FIG. 3 shows an example of the case where a resolving power R2 of the system is lower than in FIG. 2 (R2<R1), and when shake of the shake amount V1 is applied, the combinations for which the resolving power of the system does not drop increase in number compared to FIG. 2. This is because the original resolving power of the system is low, and thus sensitivity to shake decreases.

In this way, even if shake of the same magnitude is applied, the combinations of focal length and exposure period for which the resolving power of the system does not drop change, depending on the original resolving power of the system. Utilizing this characteristic, whether to perform alignment and compositing, and, in the case of performing alignment and compositing, the exposure period (charge accumulation period) for each of the plurality of images to be used in compositing are determined, according to the original resolving power of the system. It is thereby possible to reduce the processing load and to reduce deterioration in the image quality of the image obtained through alignment and compositing.

Next, the influence of the shooting magnification will be described. When the shooting magnification is low, the influence of translational shake is negligible, but since the shake amount increases when translational shake occurs, the region in which the resolving power of the system does not drop becomes smaller. It is thus necessary to also take the shooting magnification into consideration in determining whether to perform alignment and compositing, and in determining the exposure period for each of the plurality of images in the case of performing alignment and compositing.

FIG. 4 shows an example in which a shooting magnification M2 is larger than a shooting magnification M1 shown in FIG. 2 (M2>M1), and when shake of the shake amount V1 is applied, the combinations for which the resolving power of the system does not drop are fewer in number, compared to FIG. 2. In this way, the combinations for which the resolving power of the system does not drop change according to the shooting magnification, and the combinations for which the resolving power of the system does not drop are fewer in number as the shooting magnification increases.

Next, a case in which optical image stabilization is performed utilizing the image sensor 6 and/or the correction lens 9 will be described. In a case where optical image stabilization is performed, the combinations for which the resolving power of the system does not drop increase in number, compared to a case where optical image stabilization is not performed. FIG. 5 shows an example thereof. In FIG. 5, even if other conditions are the same as FIG. 2, the combinations for which the resolving power of the system does not drop are considerably more compared to FIG. 2. Since the combinations for which the resolving power of the system does not drop increase in number in this way, it is desirable to also use optical image stabilization.

In view of this, the camera system control unit 5 determines the combinations of focal length and exposure period for which the resolving power of the system does not drop, and determines whether to perform alignment and compositing and also the exposure period for each of the plurality of images in the case of performing alignment and compositing, based on the resolving power of the system, the shooting magnification, and the performance of optical image stabilization. It is thereby possible to reduce the processing load and to reduce deterioration in the image quality of the image obtained through alignment and compositing.

Note that the influence of shake on the combination of focal length and exposure period which depends on the resolving power of the system, the shooting magnification and whether optical image stabilization is to be performed may be held in the form of tables as described above, or may be held as mathematical formulas. Note that the tables or formulas are created on the basis of shake amounts measured in advance. At this time, if the shake amount is 0, the resolving power of the system does not drop no matter how long the focal length and how slow the shutter speed. Thus, the amount by which the resolving power of the system drops when the focal length and exposure period are changed is acquired, assuming that a predetermined amount of shake occurs in the image capturing system. FIGS. 2 to 5 described above are tables acquired in this way. Also, the shake amount may be measured with the angular velocity detection unit 15 or the acceleration detection unit 16 while the image capturing system 100 is in use, and a resolving power of the system that is based on the measured shake amount may be acquired, by updating the tables or formulas as appropriate based on the measured shake amount.

Note that the tables in FIGS. 2 to 5 are tables showing how much the resolving power of the system drops from the original resolving power of the system (coincides with the resolving power when the shake amount is 0), but tables or formulas indicating the resolving power of the image capturing system, which depends on the combination of focal length and exposure period, when a predetermined amount of shake occurs in the system, may be used, instead of the original resolving power of the system. In this case, tables containing numerical values of the resolving power or formulas corresponding thereto will be held in the differentiated cells of FIGS. 2 to 5. By comparing these tables with the original resolving power of the system, information on how much the resolving power of the system will drop can be acquired.

Also, FIGS. 2 to 5 are tables in which the degree to which the resolving power drops is divided into three levels, but the number of levels is not particularly limited, and the difference between the original resolving power of the system and the resolving power when a predetermined amount of shake occur in the image capturing system may be held as a numerical value. Also, information indicating the resolving power as a percentage of the original resolving power of the system, which is taken as 100%, may be used. This information is collectively referred to as information indicating the resolving power of the image capturing system when shake of a predetermined magnitude occurs.

Next, processing by the image capturing system 100 of the present embodiment will be described, with reference to the flowchart in FIG. 6.

First, in step S101, the camera system control unit 5 detects the resolving power of the system. As a method for detecting the resolving power of the system, the camera system control unit 5 receives MTF information from the lens unit 2, compares the MTF information with the number of recording pixels that is currently set, and takes whichever results in a lower resolving power as the resolving power of the system. Note that, in the case where the image capturing system 100 is not an interchangeable lens-type system, the MTF of the imaging optical system is stored in advance in a memory (not shown) within the camera body 1.

Next, in step S102, the camera system control unit 5 detects the focal length and the shooting magnification. Since the focal length is determined by the characteristics of the imaging optical system, particularly the position of the zoom lens in the case where the lens unit 2 has a zoom lens, the position information of the zoom lens is acquired from the lens unit 2. Also, the shooting magnification is determined by the focal length and the distance to the subject, and the distance to the subject can be derived using information on the in-focus position (e.g., position information of the focus lens included in the lens unit 2).

In step S103, the camera system control unit 5 detects the exposure period. In the case of auto mode, the exposure period is determined by E or the like, and, in the case of manual mode, the exposure period is set by an operation from an operation unit (not shown) by the user.

Furthermore, in step S104, information relating to whether to perform optical image stabilization is acquired.

In step S105, the camera system control unit 5 then determines whether to perform alignment and compositing. Here, the influence of shake on the resolving power of the system is determined by checking the conditions acquired in steps S101 to S104 against data corresponding to the diagrams shown in FIGS. 2 to 5 created in advance. Specifically, when the obtained conditions correspond to the shaded portion, the camera system control unit 5 determines not to perform alignment and compositing, since the resolving power of the system will not decrease even if camera shake occurs. On the other hand, when the obtained conditions do not correspond to the shaded portion, the camera system control unit 5 determines to perform alignment and compositing, since the resolving power of the system will decrease if camera shake occurs.

If it is determined to perform alignment and compositing, the processing proceeds to step S106, and if it is determined not to perform alignment and compositing, the processing proceeds to step S107.

In step S106, the camera system control unit 5 determines the exposure period for each of the plurality of images to be used in alignment and compositing and the number of shots, such that the total exposure period will match the exposure period detected in step S103. At this time, it is preferable to select a combination of exposure period and number of shots in a range in which the resolving power of the system does not drop, by checking against the conditions obtained in steps S101 to S104. The exposure period at the time of shooting each image is controlled utilizing an electronic shutter function of the image sensor 6. Here, the number of times shooting is to be performed can be reduced by selecting a combination such that the exposure period is as long as possible within the range in which the resolving power of the system does not drop, thus enabling a reduction in the number of images to be composited at the time of alignment and compositing described later. Also, a combination for which the total exposure period determined by the combination of an exposure period of an image controllable by the electronic shutter function and the number of shots is the closest to the exposure period detected in step S103 may be selected. Once the exposure period and the number of shots are determined, the processing proceeds to step S107.

In step S107, the camera system control unit 5 determines whether shooting is instructed by the release detection unit 7, and, if shooting is not instructed, the processing returns to step S101. On the other hand, if shooting is instructed, the processing proceeds to step S108.

In step S108, the camera system control unit 5 controls units including the image sensor 6 to perform image shooting. At this time, in the case of not performing alignment and compositing, one image is shot at the exposure period determined in step S103, and, in the case of performing alignment and compositing, the determined number of images are each shot at the exposure period determined in step S106.

In step S109, the camera system control unit 5 then determines whether to perform alignment and compositing. In the case of not performing alignment and compositing, the processing is directly ended, and, in the case of performing alignment and compositing, the processing proceeds to step S110.

In step S110, the image processing unit 19 generates an image in which camera shake is suppressed, by detecting the motion vector between the plurality of images shot in step S108 with the motion vector detection unit 19a, and performing alignment and compositing based on the detected motion vector.

According to the present embodiment as described above, the decrease in the resolving power of the system is determined, based on the resolving power of the system, the shooting magnification, whether optical image stabilization is to be performed, the focal length and the exposure period, and alignment and compositing is performed if it is determined that the resolving power of the system will decrease. In the case where the resolving power of the system will not decrease due to shake, the processing load is thereby reduced by not performing alignment and compositing, and, in the case where the resolving power of the system will decrease due to shake, deterioration in image quality can be reduced by performing alignment and compositing.

Also, by selecting a combination of exposure period and number of shots that does not result in a decrease in the resolving power of the system in the case of performing alignment and compositing, deterioration in the image quality of the image that is obtained through alignment and compositing can be reduced.

Other Embodiments

The above-described embodiment is given as an example of the present invention, and the invention is not limited to this embodiment, with various modifications and changes being possible without departing from the gist of the invention.

For example, in the above-described embodiment, when determining whether to perform alignment and compositing in step S105, it is determined whether the resolving power of the image capturing system will decrease, that is, whether the decrease in resolving power will be 0, but it may be determined whether the amount of decrease is less than or equal to a threshold value or exceeds the threshold value. This threshold value may be set as a percentage (e.g., 5%) of the resolving power of the system, or may be set as an amount (e.g., 1 million pixels). If the threshold value is set to 0, it will be determined whether a decrease in resolving power will occur. If the decrease in resolving power will be slight but not zero, depending on the accuracy of alignment and the like, the decrease in image quality may be less if compositing is not performed, or the resulting decrease in resolving power may not be perceivable or barely perceivable to the naked eye.

Also, the above embodiment describes a mode in which, in the case where it is determined in step S105 to perform alignment and compositing, the exposure period per shot is determined in step S106 in a range in which the resolving power of the image capturing system does not decrease. However, in step S106, a mode may be similarly adopted in which a tolerable amount of decrease in the resolving power is set, and, as long as the amount of decrease falls within this range, the exposure period per shot can be selected based on matching with the number of times shooting is to be performed or the exposure period determined in step S103. For example, a mode may be adopted in which, in the case where the resolving power is 50 million pixels, the exposure period determined in step S103 is T, the threshold value is 5%, the resolving power is 48 million pixels if the exposure period is ½T, and the resolving power is 50 million pixels if the exposure period is ¼T, ½T is selected as the exposure period per shot.

Also, a mode may be adopted in which, in the case where it is determined in step S105 to perform alignment and compositing, shooting is performed a predetermined number of times and compositing is performed. For example, a mode may be adopted in which the number of times shooting is to be performed is set to five, and shooting is performed five time and the five shot images are aligned and composited, even if the resolving power does not drop in the case where the number of times shooting to be performed is two, or even if the resolving power does not drop unless the number of times shooting to be performed is six. In this case, there is a possibility that the number of times shooting is to be performed will be more than in the case of determining the exposure period per shot with consideration for the resolving power in step S106. However, problems such as image quality decreasing and processing load increasing due to unnecessary alignment and compositing can be mitigated more than in the conventional mode in which step S105 is not performed and alignment and compositing are always performed.

Conversely, there is also a possibility that a decrease in resolving power will occur with shooting being performed a predetermined number of times, but the degree to which the resolving power decreases can be mitigated, compared to the case where alignment and compositing is not performed. In this way, control of the image capturing system can be simplified, by adopting a configuration in which shooting is performed a predetermined number of times in the case where it is determined to perform alignment and compositing. Note that the predetermined number of times shooting is to be performed need only be other than one, and may be changed according to the shooting conditions. For example, for each focal length, shooting may be performed 2 times at that focal length, 5 times at a longer focal length, and 8 times at an even longer focal length.

Also, the above embodiment only describes the case where the focal length is changeable, but the present invention can also be applied to an image capturing system in which the focal length cannot be changed, such as the case where the lens unit and the camera body are integrated as one and the lens unit does not have a zoom lens. Note that the image capturing system in which the lens unit and the camera body are integrated as one is not particularly limited in form, and, apart from being a compact digital camera, may be a camera provided by a mobile device such as a smartphone, a surveillance camera, a network camera or the like. In the case of an image capturing system in which the focal length cannot be changed, the tables shown in FIGS. 2 to 5 will be one-dimensional, and it is determined whether to perform alignment and compositing, using information indicating the resolving power of the image capturing system when shake of a predetermined magnitude occurs, which depends on the exposure period.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-002559, filed Jan. 11, 2023 which is hereby incorporated by reference herein in its entirety.

What is claimed is:

1. An image stabilization apparatus comprising one or more processors and/or circuitry which function as:

a control unit that controls image stabilization for reducing image blur, by shooting a plurality of images with an image sensor, and aligning and compositing the plurality of images;

an acquisition unit that acquires information relating to an exposure period and a resolving power of an image capturing system including the image sensor; and a determination unit that determines whether to perform the image stabilization, based on the information, wherein the acquisition unit acquires and compares a resolving power of a signal read out from the image sensor and a resolving power of an imaging optical system configured to form light from a subject into an image on the image sensor under currently set shooting conditions, and determines the lower one of the resolving powers as the resolving power of the image capturing system.

2. The image stabilization apparatus according to claim 1, wherein the determination unit determines to perform the image stabilization if a difference between the resolving power of the image capturing system and a resolving power of the image capturing system in a case where shake of a predetermined magnitude occurs, which depends on the exposure period, is greater than a threshold value, and determines not to perform the image stabilization if the difference is less than or equal to the threshold value.

3. The image stabilization apparatus according to claim 1, wherein the one or more processors and/or circuitry further function as:

a storage unit that holds information indicating a resolving power of the image capturing system in a case where shake of a predetermined magnitude occurs, which depends on the exposure period, wherein the determination unit determines whether to perform the image stabilization, based on the information stored in the storage unit and the information relating to the resolving power acquired by the acquisition unit.

4. The image stabilization apparatus according to claim 3, wherein the control unit, in a case of performing the image stabilization, determines an exposure period for shooting each of the plurality of images, based on the information stored in the storage unit.

5. The image stabilization apparatus according to claim 4, wherein the determination unit determines an exposure period for which the difference from the resolving power acquired by the acquisition unit is less than or equal to a threshold value as the exposure period for shooting each of the plurality of images, based on the information stored in the storage unit and the information relating to the resolving power acquired by the acquisition unit.

6. The image stabilization apparatus according to claim 5, wherein the control unit, in a case of performing the image stabilization, selects from combinations of a number of the plurality of images and the exposure period for shooting each of the plurality of images, determined according to the exposure period acquired by the acquisition unit, a combination in which the number of the plurality of images is smallest.

7. The image stabilization apparatus according to claim 5, wherein the control unit, in a case of performing the image stabilization, selects, from combinations of a number of the plurality of images and the exposure period for shooting each of the plurality of images, determined according to the exposure period acquired by the acquisition unit, a combination in which a total exposure period of the plurality of images is closest to the exposure period acquired by the acquisition unit.

8. The image stabilization apparatus according to claim 1, wherein the acquisition unit acquires information relating to a focal length, and the determination unit determines whether to perform the image stabilization, based on the information relating to the resolving power, the information relating to the exposure period, and the information relating to the focal length.

9. The image stabilization apparatus according to claim 1, wherein the acquisition unit acquires information relating to a shooting magnification, and the determination unit determines whether to perform the image stabilization, based on the information relating to the resolving power, the information relating to the exposure period, and the information relating to the shooting magnification.

10. The image stabilization apparatus according to claim 1, wherein the acquisition unit acquires information relating to a focal length and information relating to a shooting magnification, and the determination unit determines whether to perform the image stabilization, based on information relating to the resolving power, the information relating to the exposure period, the information relating to the focal length, and the information relating to the shooting magnification.

11. The image stabilization apparatus according to claim 1, wherein the acquisition unit further acquires information relating to whether second image stabilization by a different method from the image stabilization is to be performed, and the determination unit determines whether to perform the image stabilization, based on the information relating to the resolving power, the information relating to the exposure period, and the information relating to whether the second image stabilization is to be performed.

12. The image stabilization apparatus according to claim 11, wherein the one or more processors and/or circuitry further function as:

a storage unit that holds information indicating a resolving power of the image capturing system in a case where shake of a predetermined magnitude occurs, according to different combinations of the exposure period and whether the second image stabilization is to be performed, wherein the determination unit determines whether to perform the image stabilization, based on the information stored in the storage unit and the information relating to the resolving power acquired by the acquisition unit.

13. An image capturing system comprising:

an image sensor; and an image stabilization apparatus comprising one or more processors and/or circuitry which function as:

a control unit that controls image stabilization for reducing image blur, by shooting a plurality of images with an image sensor, and aligning and compositing the plurality of images;

an acquisition unit that acquires information relating to an exposure period and a resolving power of an image capturing system including the image sensor; and a determination unit that determines whether to perform the image stabilization, based on the information, wherein the acquisition unit acquires and compares a resolving power of a signal read out from the image sensor and a resolving power of an imaging optical system configured to form light from a subject into an image on the image sensor under currently set shooting conditions, and determines the lower one of the resolving powers as the resolving power of the image capturing system.

14. The image capturing system according to claim 13, further comprising:

an imaging optical system configured to form light from a subject into an image on the image sensor.

15. The image capturing system according to claim 14, wherein the imaging optical system is removable.

16. An image stabilization method comprising:

acquiring information relating to a focal length, a shooting magnification, an exposure period, and a resolving power of an image capturing system including an image sensor;

determining whether the resolving power decreases due to shake of a predetermined magnitude occurring, in a case of performing shooting under conditions according to the information; and performing control to perform image stabilization if it is determined that the resolving power will decrease, and to not perform the image stabilization if it is determined that the resolving power will not decrease, wherein a resolving power of a signal read out from the image sensor and a resolving power of an imaging optical system configured to form light from a subject into an image on the image sensor are compared with the compared resolving powers being under currently set shooting conditions, and the lower one of the resolving powers is determined as the resolving power of the image capturing system, and wherein the image stabilization is processing for reducing image blur, by shooting a plurality of images with the image sensor, and aligning and compositing the plurality of images.

* * * * *